United States Patent
Sankaran et al.

(10) Patent No.: US 7,035,358 B1
(45) Date of Patent: Apr. 25, 2006

(54) METHOD AND APPARATUS FOR RECEIVING A WIDEBAND SIGNAL IN THE PRESENCE OF MULTIPATH CHANNEL IMPERFECTIONS AND FREQUENCY OFFSET

(75) Inventors: Sundar G. Sankaran, Redwood City, CA (US); Paul Petrus, Santa Clara, CA (US)

(73) Assignee: ArrayComm, Inc., San Jose, CA (US)

( * ) Notice: Subject to any disclaimer, the term of this patent is extended or adjusted under 35 U.S.C. 154(b) by 878 days.

(21) Appl. No.: 09/792,002

(22) Filed: Feb. 23, 2001

(51) Int. Cl.
*H04L 27/06* (2006.01)

(52) U.S. Cl. ............... 375/344; 375/346; 375/285; 375/229

(58) Field of Classification Search ........... 375/342, 375/344, 346, 350, 348, 285, 229, 231; 455/173.1, 455/182.2, 192.2
See application file for complete search history.

(56) References Cited

U.S. PATENT DOCUMENTS 5,127,051 A * 6/1992 Chan et al.
5,150,383 A * 9/1992 Misaizu et al. ............ 375/340
5,272,655 A * 12/1993 Roza ......................... 708/313
5,802,117 A * 9/1998 Ghosh ........................ 375/344
6,347,126 B1 * 2/2002 Nagayasu et al. ........ 375/344
6,389,040 B1 * 5/2002 Viswanathan .............. 370/480
6,393,073 B1 * 5/2002 Eilts ........................... 375/340
6,522,696 B1 * 2/2003 Mobin et al. .............. 375/262
6,590,532 B1 * 7/2003 Ogawa et al. .............. 342/378
6,628,926 B1 * 9/2003 van de Beek et al. ....... 455/75

FOREIGN PATENT DOCUMENTS

EP 0959568 A1 * 11/1999

* cited by examiner

*Primary Examiner*—Jean B. Corrielus
(74) *Attorney, Agent, or Firm*—Blakely, Sokoloff, Taylor & Zafman LLP

(57) ABSTRACT

Payload reconstructing methods and apparatuses from wideband signals in the presence of multipath channel imperfections and frequency offset are disclosed. In one embodiment, a method in accordance with the teachings of the present invention includes receiving a signal, estimating a frequency offset of the received signal, performing frequency offset compensation on the received signal in response to the estimated frequency offset, performing equalization compensation on the received signal in response to the frequency offset compensated signal, and outputting payload information included in the received signal in response to the equalized frequency compensated received signal.

23 Claims, 3 Drawing Sheets

METHOD AND APPARATUS FOR RECEIVING A WIDEBAND SIGNAL IN THE PRESENCE OF MULTIPATH CHANNEL IMPERFECTIONS AND FREQUENCY OFFSET

BACKGROUND OF THE INVENTION

1. Field of the Invention

The present invention relates generally to communications systems and, more specifically, the present invention relates to receiving wideband communications signals.

2. Background Information

It is often necessary for devices to communicate with one another. Wireless communications systems enable signals to be transmitted between devices without the use of cables, wires or the like. Wideband or broadband signal transmissions are signals that occupy a large range of frequencies such that multiple frequencies or a range of frequencies are transmitted simultaneously thereby providing increased bandwidth in communications. Typical wireless communications often modulate wideband signals at high radio frequencies (RF) when transmitting signals between devices.

Wideband signals may suffer from significant delay spread introduced by the channel or medium through which the signal is carried between devices. In particular, a wideband signal excites the channel over a large bandwidth. Consequently, the different frequencies of a wideband signal can suffer channel distortions differently. As a result, the different frequencies in a wideband signal can arrive at the receiver with different delays and different amplitudes. The different delays and different amplitudes present in the wideband signal received by the receiver are sometimes referred to as multipath channel imperfections. When recovering data or information from the transmitted signal at the receiver, the multipath channel imperfections should be compensated to improve accuracy.

Another operation that is often performed in wideband communications is the down conversion of high frequency RF wideband signals to signals having low frequencies centered around for example direct current (DC) frequencies. In this situation, data or information is typically modulated onto a high frequency carrier at the transmitter end, transmitted through the channel and then down converted back down to a lower frequency at the receiver end. With these types of frequency conversions, it is common for a frequency offset to exist between the signal at the transmitter end and the signal at the receiver end due to mismatches between clocks at the transmitter and receiver ends. The presence of frequency offset in addition to the multipath channel imperfections described above further complicate the recovery of data or information from the signal by the receiver.

SUMMARY OF THE INVENTION

Payload generating methods and apparatuses from signals are disclosed. In one embodiment, a method in accordance with the teachings of the present invention includes receiving a signal, estimating a frequency offset of the received signal, performing frequency offset compensation on the received signal in response to the estimated frequency offset, performing equalization compensation on the received signal in response to the frequency offset compensated signal, and outputting payload information included in the received signal in response to the equalized frequency compensated received signal. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

In one aspect of the present invention, methods and apparatuses for recovering payload data or information from a signal are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one aspect of the present invention, a receiver in a wireless communication system is provided with the ability to recover payload from a wideband signal in the presence of multipath channel imperfections and frequency offset. In one embodiment, the receiver includes a single antenna coupled to receive the wideband signal. In one embodiment, a down converter is coupled to the antenna to down convert the received signal from high frequency values to low frequency values. In one embodiment, a payload regenerator is coupled to the down converter to compensate the received signal for the multipath channel imperfections and frequency offset and then output the payload information or data.

Figure 1:
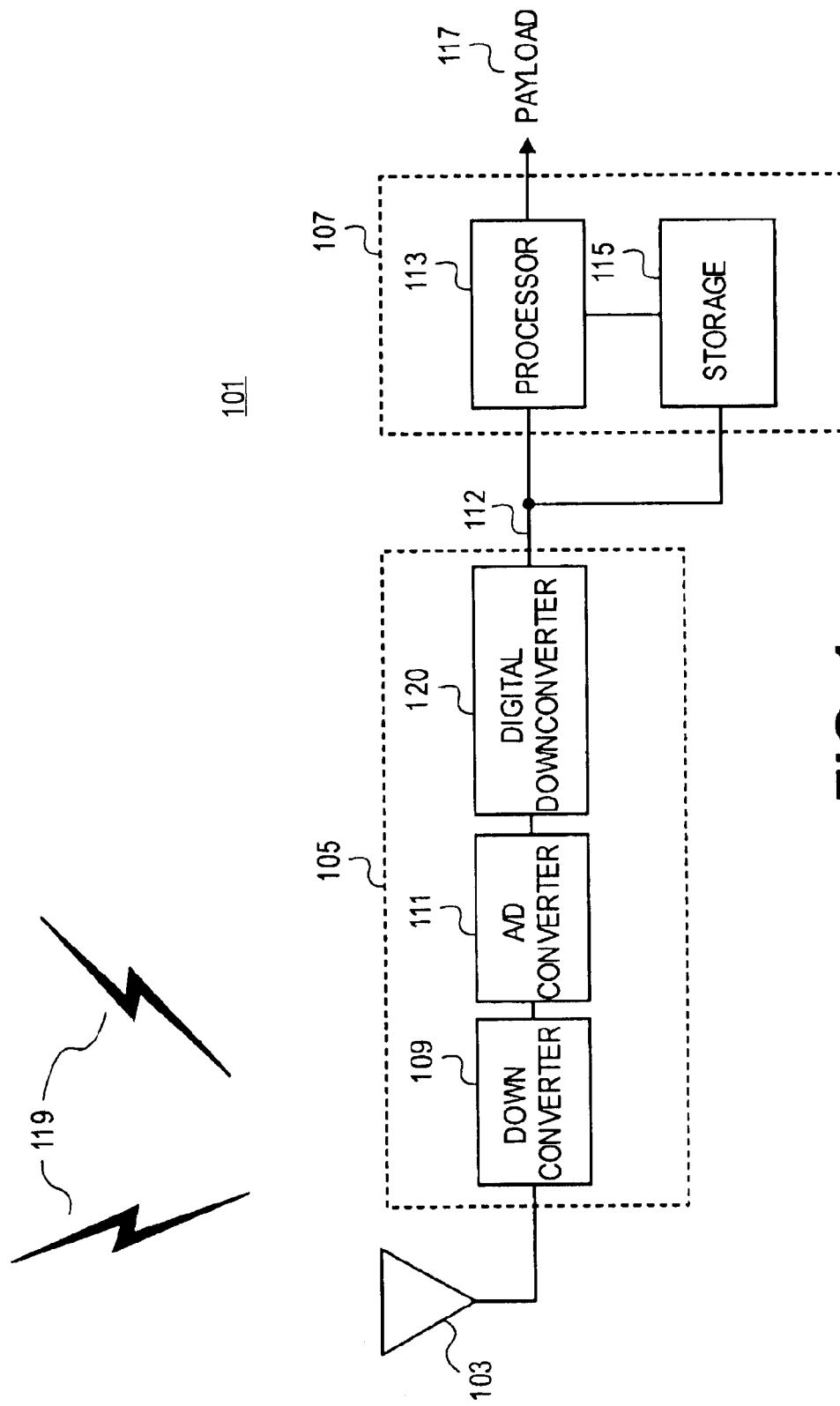
FIG. 1 is a block diagram illustration of one embodiment of an apparatus in accordance with the teachings of the present invention.

To illustrate, FIG. 1 is a block diagram illustration of one embodiment of a receiver 101 of a wireless communication system in accordance with the teachings of the present invention. As shown, receiver 101 includes an antenna 103 to receive a signal 119. In one embodiment, signal 119 may be a high frequency wideband signal including multipath channel imperfections. In one embodiment, signal 119 is a wideband signal occupying a large range of frequencies on the order of MHz and in one embodiment centered around approximately 1 GHz. It is appreciated that signal 119 may have other frequencies in accordance with the teachings of the present invention.

In one embodiment, a processing block 105 is coupled to antenna 103 to digitally down convert wideband signal 119 from for example the high frequencies around 1 GHz to a range of low frequencies around for example DC or 0 Hz and digitize the analog signal to output a converted signal 112. In one embodiment, frequency and/or phase offsets may be present between the converted signal 112 output by processing block 105 and the of signal at the transmitter before it was modulated onto the high frequency carrier (e.g. approximately 1 GHz) and transmitted through the channel to antenna 103. This frequency offset may be due to frequency mismatches between local oscillators at the transmitter end (not shown) and receiver 101. In one embodiment, processing block 105 is a digital down converter including a down converter 109 and an analog to digital (A/D) converter 111 such that signal 119 is converted to a low frequency digital signal.

In an alternate embodiment, processing block 105 outputs converted signal 112 using a down converter to down convert signal 119 to an intermediate frequency and then an A/D converter to digitize the down converted signal and then a separate digital down converter element 120 to output converted signal 112 to be centered around approximately 0 Hz. It is appreciated that the various digital down conversion techniques that may be employed by embodiments of the present invention are known to those ordinarily skilled in the art.

In one embodiment, a payload regenerator 107 is coupled to receive converted signal 112 as output by processing block 105. As will be discussed, payload regenerator recovers and outputs payload 117 information or data from signal 112. In one embodiment, payload regenerator 107 processes signal 112 to compensate for multipath channel imperfections and frequency offset to improve the recovery of payload 117. In one embodiment, payload regenerator 107 includes a processor 113 and storage 115. In one embodiment, processor 113 is coupled to A/D converter 111 to receive signal 112. In one embodiment, storage 115 is coupled to A/D converter 111 to store signal 112 and processor 113 is coupled to storage 115 to receive the signal 112. In one embodiment, storage 115 is a machine-readable medium on which software instructions that may be executed by processor 113 are stored. In one embodiment, payload 117 is output to storage 115, which may be read to access payload 117.

In one embodiment, payload regenerator 107 may be implemented using a microprocessor, a digital signal processor (DSP), a field programmable gate array, (FPGA), an application specific integrated circuit (ASIC) or the like or other future arising technology capable of processing signal 119 in accordance with the teachings of the present invention to output payload 117 with the presence of multipath channel imperfections and frequency offset. Similarly, storage 115 may be employed using random access memory (RAM), read only memory (ROM), magnetic storage devices, optical storage devices or other suitable memory devices and future arising technologies to perform the function of storing signal 119 and/or software instructions, which when executed by processor 113 perform the functions described herein in accordance with the teachings of the present invention.

FIG. 1 illustrates one embodiment of receiver 101 having the architecture of a digital communications receiver, which recovers payload 117 data or information from received bursts in signal 119. For instance, in one embodiment, each burst of information or data in signal 119 is made up of training sequences at the beginning and end, with the information or data carrying payload sequence sandwiched in between.

Figure 2:
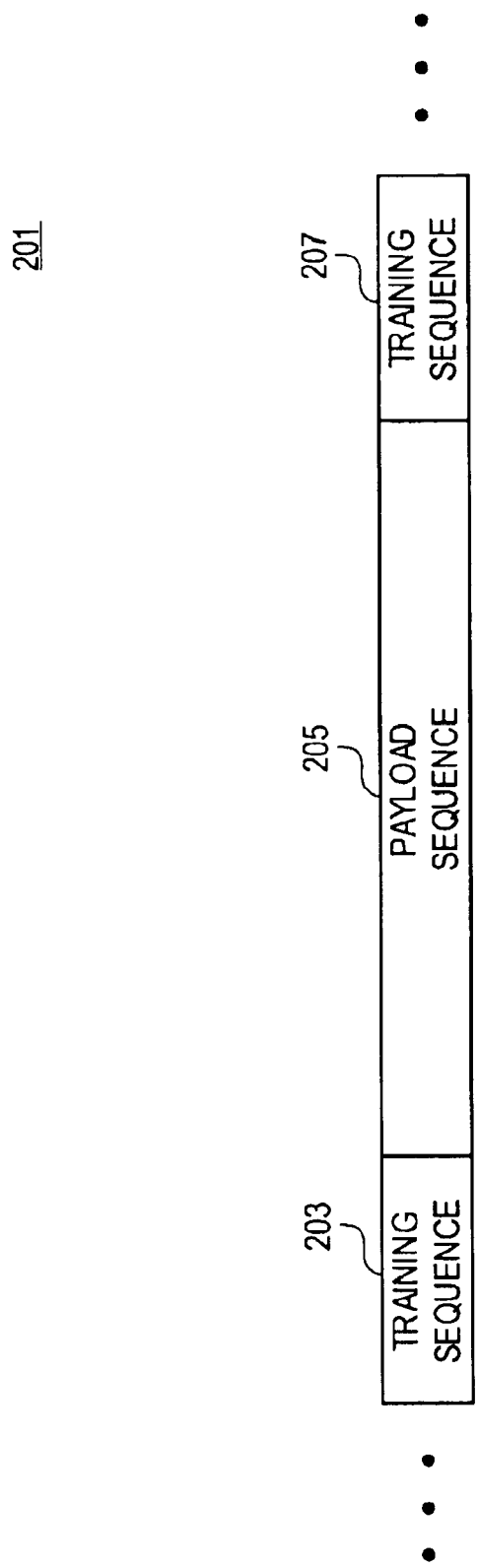
FIG. 2 is a block diagram illustrating one embodiment of payload data or information transmitted between training sequences in accordance with the teachings of the present invention.

To illustrate, FIG. 2 is an illustration of one embodiment of a burst 201 included in a signal 119 in accordance with the teachings of the present invention. As shown in FIG. 2, a payload sequence 205 is sandwiched in between a training sequence 203 and a training sequence 207. Accordingly, when burst 201 in signal 119 is received by antenna 103, training sequence 203, payload sequence 205 and training sequence 207 are received in succession.

Figure 3:
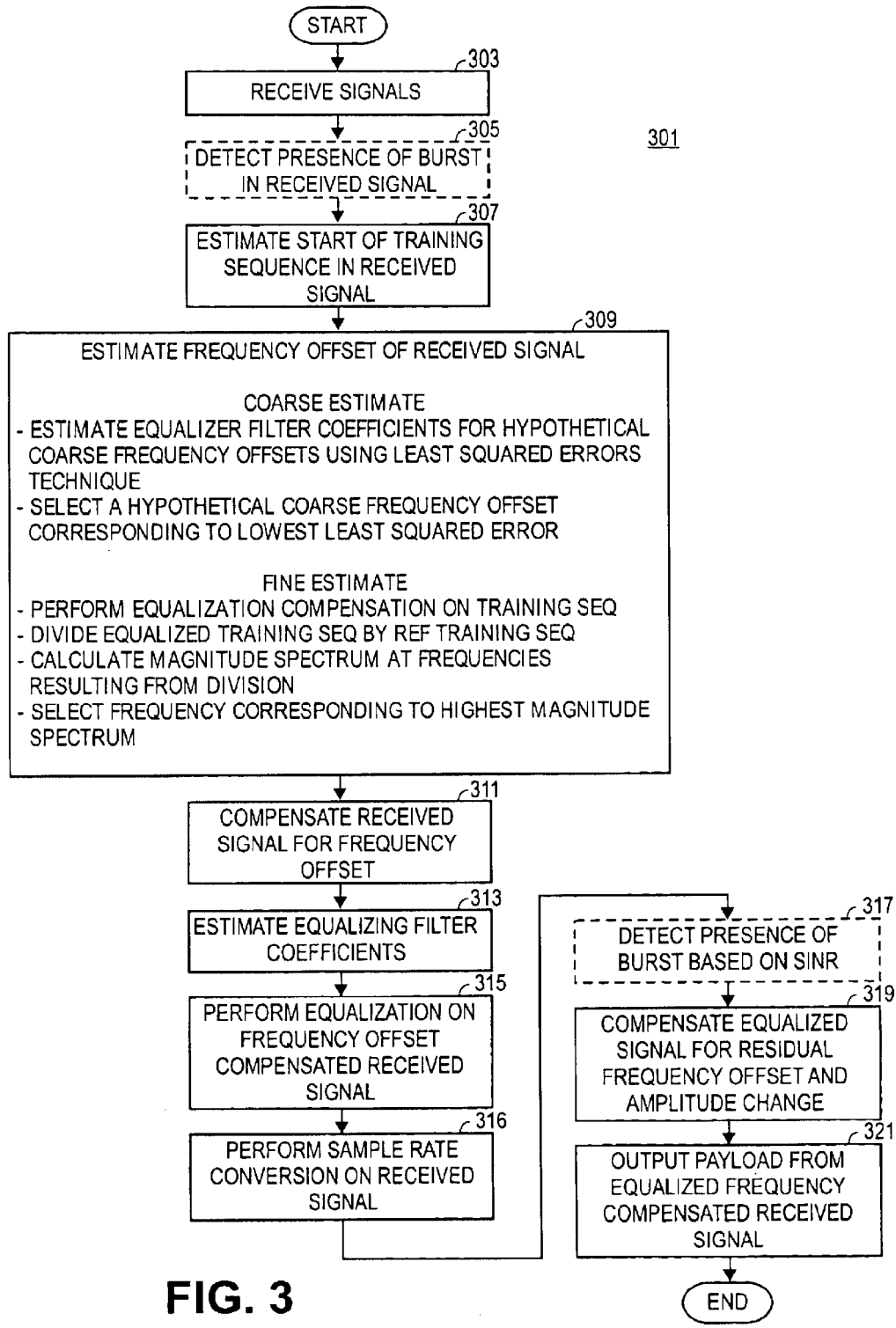
FIG. 3 is a flow diagram illustrating one embodiment a method for recovering payload data or information from a signal in accordance with the teachings of the present invention.

FIG. 3 is a flow diagram 301 illustration of one embodiment of a method for recovering payload data or information from a burst in a signal in accordance with the teachings of the present invention. The method illustrated in the flow diagram 301 of FIG. 3 may be practiced by a receiver, such as for example receiver 101, receiving a burst, such as for example burst 201.

As will be appreciated to those skilled in the art having the benefit of this disclosure, the order in which the processing is described in the example embodiments of flow diagram 301 are provided for explanation purposes. It is appreciated that in other embodiments, the processing of flow diagram 301 is not limited to precisely the same order as it is described in FIG. 3. Indeed, as will be appreciated to those skilled in the art, the order in which processing is performed may be different than the order in which it is described in the example embodiments of flow diagram 301 in accordance with the teachings of the present invention.

As shown in FIG. 3, a signal is received at block 301. In one embodiment, it is assumed that there are multipath channel imperfections and frequency offsets in the received signal. In flow diagram 301, several alternate embodiments are illustrated to detect the presence of a burst in the received. One of the embodiments is illustrated with block 305. Another one of the embodiments is illustrated with block 317. It is appreciated that if block 305 is employed, then block 317 is not utilized. Similarly, if block 317 is employed, then block 305 is not utilized.

In the embodiment in which block 305 is employed, block 305 shows that the presence of a burst is then detected in the received signal. If block 305 is not utilized, then processing skips to block 307. Block 307 shows that the start of the burst or the first training sequence in the burst is then estimated. In one embodiment, a coarse estimate for the beginning of the burst is obtained using a correlation technique. In particular, the received training sequence in the burst is correlated with a known reference training sequence. The correlation between the received training sequence at the beginning of the burst and the reference training sequence is estimated according to the following equation:

$$r_{xx}(k) = \sum_{n=0}^{n=N_1} x_n^*(n)z(n+k), \text{ for } k = 0, 1, 2, \ldots K-1, \quad \text{(Equation 1)}$$

where $x_n(n)$ and $z(n)$ denote the reference training sequence and received training sequences, respectively. $N_1$ denotes the number of training symbols in the training sequence, K represents the search window in the burst for the training sequence and * represents the complex conjugate operator. In one embodiment, the burst and/or the first training sequence is assumed to have been detected if $$\max|r_{xx}(k)| > THRESH, \quad \text{(Equation 2)}$$

where THRESH is a threshold value. Accordingly, if there is a high correlation between the received training sequence and the reference training sequence, the start of the burst has been detected in the signal in accordance with the teachings of the present invention. The coarse estimate for the start time of the burst or first training sequence is given by $$\text{argmax}(r_{x2}(k)).$$ Equation 3

Accordingly, the receiver has now detected the beginning of a burst in the received signal for processing.

Continuing with flow diagram 301, block 309 shows that a frequency offset in the received signal is then estimated. In one embodiment, a receiver in accordance with the teachings of the present invention estimates the frequency offset present in the signal based on the first training sequence $z_n(n)$ received at the beginning of the burst. If the received training sequence and known reference training sequences are aligned in time, in the absence of multipath channel imperfections such as intersymbol interference (ISI), the peak of the spectrum of the signal $z_n(n)/x_n(n)$ would give an estimate for the frequency offset. However, due to the possibility of delay in the transmit data chain and also due to the timing mismatch between the local transmitter and receiver clocks, the received signal is assumed not to be time aligned with the reference signal.

In one embodiment, the frequency offset of the received signal is estimated generally in two steps. In particular, the frequency offset is estimated by (1) coarsely estimating the frequency offset present in the received signal, and then (2) finely estimating the frequency offset present in the received signal. In one embodiment, the coarse estimate involves joint estimation of equalizing filter coefficients and hypothetical coarse frequency offset estimations based on the received training sequence and the known reference training sequence.

To illustrate, a plurality of $M_c$ different hypothetical coarse frequency offsets $(\omega_1, \omega_2, \ldots \omega_{M_c})$ are assumed. For example, if $M_c=5$, hypothetical coarse frequency offsets could be −5 KHz, −2.5 KHz, 0 KHz, 2.5 KHz and 5 KHz. For each hypothetical coarse frequency offsets, equalizing filter coefficients are estimated using a known least squared errors technique. As is known to those skilled in the art, an equalizing filter having the correct coefficients may be used to compensate for multipath channel imperfections, timing alignment as well as ISI reduction. In one embodiment, for each hypothetical i, the equalizing filter coefficients are the solution to the following system of equations:

$$R_{zz}w_i = r_{xx},$$ (Equation 4)

where $R_{zz}$ is the autocorrelation matrix of the frequency shifted received training signal $z_n(n)\exp(-j\omega_i)$, $w_i$ represents the equalizing filter coefficients and $r_{zx}$ is the cross correlation between $z_n(n)\exp(-j\omega_i)$ and $x_n(n)$. The corresponding least squares error is therefore given by $$E_i = \delta^2 - r_{zx}^H w_i,$$ (Equation 5)

where $E_i$ is the least squared error calculation and $\delta^2$ is the variance of the reference training signal. In one embodiment, the particular hypothetical coarse frequency offset $(\omega_1, \omega_2, \ldots \text{ or } \omega_{M_c})$ that corresponds to the lowest minimum least squares error $E_i$ is taken as the estimate for coarse frequency offset in accordance with the teachings of the present invention.

In one embodiment, after the coarse frequency offset is estimated, the received training signal is then compensated with an equalizing filter using coefficients corresponding to the coarse frequency offset estimated above. This is then followed by a fine search for the actual frequency offset. In one embodiment, the search for the fine estimate of the frequency offset is performed with search frequencies that are chosen based on the previously discussed coarse estimate of the frequency offset and the least squares error corresponding to the various hypothetical frequency offsets.

To illustrate, assume that wk is the coarse estimate of the frequency offset determined above. Then, if least squared error value $E_{k-1} < E_{k+1}$, a plurality of $M_f$ different frequencies between $\omega_{k-1}$ and $\omega_k$ are chosen as the fine hypothetical search frequencies. Otherwise, a plurality of $M_f$ different frequencies between $\omega_k$ and $\omega_{k+1}$ are chosen as the fine hypothetical search frequencies. In one embodiment, compensated received training sequence generated by the equalizing filter using coefficients based on the coarse frequency offset estimation is then divided by the reference training signal.

In one embodiment, the magnitude spectrum of the result of the division of the compensated received training sequence and the reference training signal is then calculated at the $M_f$ different chosen frequencies between $\omega_{k-1}$ and $\omega_k$ or between $\omega_k$ and $\omega_{k+1}$. In one embodiment, the magnitude spectrum is generated by calculating the discrete fourier transform (DFT) of the result of the division of the compensated received training sequence and the reference training signal at the chosen frequencies. In one embodiment, the hypothetical fine search frequency between $\omega_{k-1}$ and $\omega_k$ or between $\omega_k$ and $\omega_{k+1}$ yielding the highest value in the magnitude spectrum calculation is the fine estimate for the frequency offset in accordance with the teachings of the present invention.

In one embodiment, the estimated frequency offset, based on the coarse and fine estimates using the received training sequence discussed above, is used to compensate the entire burst in the raw received signal, as shown in block 311. Accordingly, the raw received signal, including the first training sequence, the payload sequence and the second training sequence, is compensated for frequency offset.

Next, as shown in block 313, equalizing filter coefficients are then re-estimated using the training sequence compensated for frequency offset as generated at block 311. In one embodiment, a known least squares technique is used to estimate the equalizing filter coefficients of block 313 using the frequency compensated training sequence.

At block 315, the received signal that was compensated for frequency offset at block 311 is now compensated with an equalizing filter using the equalizing filter coefficients estimated at block 313. In one embodiment, the equalization compensation provided by the equalizing filter at block 315 compensates the received signal for multipath channel imperfections, timing alignment and helps perform ISI elimination in accordance with the teachings of the present invention.

In one embodiment, the signal carrying the burst is oversampled. In the event of oversampling of the signal, block 316 show that the sample rate conversion is then performed on the frequency offset compensated, time-aligned, ISI-eliminated and multipath channel compensated signal generated at block 315. For example, in one embodiment, the received signal may have originally been oversampled at a rate of 2×. The sample rate conversion performed at block 316 down converts the received signal accordingly to obtain baud samples. It is appreciated of course that the signal may have been sampled rates other than 2× in accordance with the teachings of the present invention.

After the sample rate conversion performed at block 316, onbaud points of the received signal are produced. In one embodiment, it is assumed that the onbaud points may still have some residual frequency offset, since there were only a finite number (e.g. $M_c$ and $M_f$) of coarse and fine frequency offset search points used in the processing at block 309 described above.

In an embodiment in which block 305 is utilized to detect the presence of a burst, processing proceeds to block 319. However, in an embodiment in which block 305 is not utilized, block 317 is performed next to detect the presence of a burst. At block 317, a signal to interference plus noise ratio (SINR) calculator is then employed to calculate the signal to interference plus noise ratio. The detection of the presence of a burst is then determined based on the result of the SINR.

In one embodiment, residual frequency offset and amplitude change compensation is performed on the equalized signal at block 319. In one embodiment, residual frequency offset compensation is performed by computing two single-tap equalizers or automatic gain control coefficients based on the first and second training sequences of the burst in the received signal generated at block 317. For instance, assume that $x'_n$, $z'_n$, $X'_n$ and $z'_n$ denote the known reference and received training sequences at the beginning and end of the burst of the received signal, respectively. The equalizer taps for the beginning and the end are given by the following equations:

$$\phi_1 = \frac{z'^H_{t1} x'_{t1}}{z'^H_{t1} z'_{t1}},$$ (Equation 6)

$$\phi_2 = \frac{z'^H_{t2} x'_{t2}}{z'^H_{t2} z'_{t2}},$$ (Equation 7)

where $\phi_1$ and $\phi_2$ are complex multipliers or scalars that relate the known reference and received training sequences $x_t$ and $z_t$.

Based on the two estimates above for $\phi_1$ and $\phi_2$, a time-varying single-tap equalizer is computed for the payload segment in one embodiment. The magnitude and phase of this time varying equalizer are obtained by linearly interpolating the magnitude and phase of the equalizers computed at the beginning and end of the burst of the received signal to compensate for the residual frequency offset and amplitude change. The payload baudpoints are passed through this equalizer to compensate for the remaining residual frequency offset and amplitude change in accordance with the teachings of the present invention.

At block 321, the payload data or information from the payload sequence is then generated using known decoding techniques, such as for example a hard decision decoder or the like. If the payload is convolutionally encoded, a known decoder such as for example a Viterbi or Fano decoder or the like may be used to generate the payload data or information.

Thus, payload information or data is generated from the received signal. Embodiments of methods and apparatuses in accordance with the teachings of the present invention provide the ability to recover the payload information or data from wideband signals, even in the presence of multi-path channel imperfections and frequency offset.

In the foregoing detailed description, including what is described in the Abstract, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method, comprising:

receiving a signal;

estimating a frequency offset of the received signal, wherein estimating the frequency offset comprises coarsely estimating the frequency offset of the received signal and finely estimating the frequency offset of the received signal, wherein coarsely estimating the frequency offset of the received signal comprises:

estimating a plurality of equalizer filter coefficients for a plurality of hypothetical coarse frequency offsets using at least squared error technique; and selecting one of the plurality of hypothetical coarse frequency offsets corresponding to a lowest least squared error as a coarse estimation of the frequency offset;

performing frequency offset compensation on the received signal in response to the estimated frequency offset;

performing equalization compensation on the received signal in response to the frequency offset compensated signal; and outputting payload information included in the received signal in response to the equalized frequency compensated received signal.

2. The method of claim 1 wherein the received signal includes the payload information between first and second training sequences included in the received signal, the method further comprising estimating the start of said received first training sequence included in the received signal.

3. The method of claim 2 wherein estimating the start of the first training sequence comprises correlating the received first training sequence with a reference first training sequence.

4. The method of claim 1 further comprising performing sample rate conversion on the equalized frequency compensated signal.

5. The method of claim 1 further comprising performing residual frequency offset and amplitude change compensation on the received signal after performing equalization compensation on the received signal.

6. The method of claim 1 wherein finely estimating the frequency offset of the received signal comprises:

performing equalization compensation on a received first training sequence included in the received signal in response to the coarse estimate of the frequency offset of the received signal;

dividing the equalized received first training sequence by a reference first training sequence;

calculating a magnitude spectrum at a plurality of frequencies of a result of the division of the equalized received first training sequence by the reference first training sequence; and selecting one of the plurality of frequencies corresponding to a highest magnitude spectrum calculation as a fine estimation of the frequency offset.

7. The method of claim 1 wherein performing equalization compensation on the received signal comprises estimating equalizing filter coefficients in response to a frequency offset compensated received first training sequence.

8. An apparatus, comprising:
an antenna to receive a signal; and
a payload regenerator coupled to the antenna to receive the signal, the payload regenerator to compensate the received signal for frequency offset by coarsely estimating the frequency offset and then finely estimating the frequency offset, and to equalize the frequency compensated received signal to generate payload information included in the received signal, wherein the payload regenerator is coupled to finely estimate the frequency offset by equalizing a first training sequence included in the received signal in response to the coarse estimate of the frequency offset of the received signal, dividing the equalized received first training sequence by a reference first training sequence, calculating a magnitude spectrum at a plurality frequencies of a result of the division of the equalized received first training sequence by the reference first training sequence and selecting one of the plurality of frequencies corresponding to said highest magnitude spectrum calculation as a fine estimation of the frequency offset.

9. The apparatus of claim 8 further comprising a converter coupled between the antenna and the payload regenerator.

10. The apparatus of claim 9 wherein the converter comprises:
a down converter to convert the signal from a broadband radio frequency (RF) signal to a baseband signal; and
an analog to digital (A/D) converter to convert the baseband signal from analog to digital, the payload regenerator receiving the received signal through an output of the A/D converter.

11. The apparatus of claim 9 wherein the converter comprises:
a down converter to convert the signal from a broadband radio frequency (RF) signal to an intermediate frequency signal;
an analog to digital (A/D) converter to convert the intermediate frequency signal from analog to digital; and
a digital down converter coupled to the A/D converter to convert the digitized intermediate frequency signal to a digital baseband signal, the payload regenerator receiving the received signal through an output of the digital down converter.

12. The apparatus of claim 8 wherein the payload regenerator comprises any one of a digital signal processor (DSP), microprocessor, field programmable gate array (FPGA) or application specific integrated circuit (ASIC) to generate the payload information included in the received signal.

13. The apparatus of claim 8 wherein the payload regenerator comprises storage to store the received signal.

14. The apparatus of claim 8 wherein the payload regenerator is coupled to estimate a start of a first training sequence included in the received signal by correlating the first training sequence included in the received signal with a reference first training sequence.

15. The apparatus of claim 8 wherein the payload regenerator is coupled to coarsely estimate the frequency offset by estimating a plurality of equalizer filter coefficients for a plurality of hypothetical coarse frequency offsets using a least squared errors technique and selecting one of the plurality of hypothetical coarse frequency offsets corresponding to a lowest least squared error as a coarse estimation of the frequency offset.

16. The apparatus of claim 8 wherein the payload regenerator is coupled to compensate for residual frequency offset and amplitude change in the received signal after the received signal is equalized and frequency compensated.

17. A machine-readable medium having stored thereon instructions, which when executed cause:
a signal to be received;
a frequency offset of the received signal to be estimated, wherein to estimate the frequency offset comprises coarsely estimating the frequency offset of the received signal and finely estimating the frequency offset of the received signal, wherein coarsely estimating the frequency offset of the received signal comprises:
estimating a plurality of equalizer filter coefficients for a plurality of hypothetical coarse frequency offsets using a least squared error technique; and
selecting one of the plurality of hypothetical coarse frequency offsets corresponding to a lowest least squared error as a coarse estimation of the frequency offset;
frequency offset compensation to be performed on the received signal in response to the estimated frequency offset;
equalization compensation to be performed on the received signal in response to the frequency offset compensated signal; and
payload information included in the received signal to be output in response to the equalized frequency compensated received signal.

18. The machine-readable medium of claim 17 wherein the received signal includes the payload information between first and second training sequences included in the received signal, the machine-readable medium having stored thereon further instructions, which when executed cause the start of said received first training sequence included in the received signal to be estimated.

19. The machine-readable medium of claim 18 wherein the frequency offset of the received signal being estimated comprises correlating the received first training sequence with a reference first training sequence.

20. The machine-readable medium of claim 17 wherein further instructions are stored on the machine-readable medium, which when executed cause sample rate conversion to be performed on the equalized frequency compensated signal.

21. The machine-readable medium of claim 17 wherein further instructions are stored on the machine-readable medium, which when executed cause residual frequency offset and amplitude change compensation to be performed on the received signal after equalization compensation is performed on the received signal.

22. The machine-readable medium of claim 17 wherein finely estimating the frequency offset of the received signal comprises:
performing equalization compensation on a received first training sequence included in the received signal in response to the coarse estimate of the frequency offset of the received signal;
dividing the equalized received first training sequence by a reference first training sequence;
calculating a magnitude spectrum at a plurality frequencies of a result of the division of the equalized received first training sequence by the reference first training sequence; and
selecting one of the plurality of frequencies corresponding to the highest magnitude spectrum calculation as a fine estimation of the frequency offset.

23. The machine-readable medium of claim 17 wherein the equalization compensation performed on the received signal comprises estimating equalizing filter coefficients in response to a frequency offset compensated received first training sequence.

* * * * *